United States Patent
Ku

(10) Patent No.: US 9,703,464 B2
(45) Date of Patent: Jul. 11, 2017

(54) METHOD OF CONTROLLING USER INPUT USING PRESSURE SENSOR UNIT FOR FLEXIBLE DISPLAY DEVICE

(71) Applicant: Samsung Display Co., Ltd., Yongin, Gyeonggi-Do (KR)

(72) Inventor: Ja-Seung Ku, Yongin (KR)

(73) Assignee: Samsung Display Co., Ltd., Giheung-Gu, Yongin, Gyeonggi-Do (KR)

( * ) Notice: Subject to any disclaimer, the term of this patent is extended or adjusted under 35 U.S.C. 154(b) by 354 days.

(21) Appl. No.: 13/946,985

(22) Filed: Jul. 19, 2013

(65) Prior Publication Data

US 2014/0168139 A1 Jun. 19, 2014

(30) Foreign Application Priority Data

Dec. 18, 2012 (KR) .................. 10-2012-0148229

(51) Int. Cl.
| | | |
|---|---|---|
| G06F 3/045 | (2006.01) | |
| G06F 3/0484 | (2013.01) | |
| G06F 3/041 | (2006.01) | |
| G09G 3/20 | (2006.01) | |

(52) U.S. Cl.
CPC ........ *G06F 3/04845* (2013.01); *G06F 3/0414* (2013.01); *G09G 3/20* (2013.01); *G09G 2340/045* (2013.01); *G09G 2380/02* (2013.01)

(58) Field of Classification Search
CPC .. G06F 3/04845; G06F 3/0414; G06F 3/0487; G09G 2380/02
USPC ...................................... 345/174
See application file for complete search history.

(56) References Cited

U.S. PATENT DOCUMENTS

| | | | | |
|---|---|---|---|---|
| 5,740,801 | A | * | 4/1998 | Branson ................ 600/407 |
| 6,002,389 | A | | 12/1999 | Kasser |
| 2004/0008191 | A1 | | 1/2004 | Poupyrev et al. |
| 2006/0066589 | A1 | * | 3/2006 | Ozawa et al. ........... 345/173 |
| 2006/0238520 | A1 | | 10/2006 | Westerman et al. |
| 2007/0205997 | A1 | | 9/2007 | Lieshout et al. |
| 2009/0027353 | A1 | | 1/2009 | Im et al. |
| 2010/0013775 | A1 | * | 1/2010 | Son ................... 345/168 |
| 2010/0017710 | A1 | | 1/2010 | Kim et al. |
| 2010/0079395 | A1 | | 4/2010 | Kim et al. |

(Continued)

FOREIGN PATENT DOCUMENTS

| | | |
|---|---|---|
| JP | 2005182367 A | 7/2005 |
| KR | 10-2006-0134130 | 12/2006 |

(Continued)

OTHER PUBLICATIONS

European Office Action issued by European Patent Office on Apr. 14, 2014 in corresponding European Patent Application No. 13186286.4.

(Continued)

*Primary Examiner* — Gustavo Polo
(74) *Attorney, Agent, or Firm* — Robert E. Bushnell, Esq.

(57) ABSTRACT

There is provided a method of controlling a user input using a pressure sensor unit for a flexible display device in which the pressure sensor unit for sensing a touch position through pressure transmitted when a touch is made is formed on one surface of a substrate, by which a user may zoom in/out a displayed image by only one hand using the intensity and pattern of input touch pressure.

20 Claims, 5 Drawing Sheets

(56) References Cited

U.S. PATENT DOCUMENTS

2010/0300862 A1\* 12/2010 Tamura et al. ............... 200/600
2012/0146930 A1    6/2012 Lee
2012/0162122 A1    6/2012 Geaghan

FOREIGN PATENT DOCUMENTS

KR    10-2009-0074642    7/2009
KR    10-2010-0009986    1/2010

OTHER PUBLICATIONS

Extended European Search Report from the European Patent Office on Mar. 7, 2017 with respect to the European Patent Application No. 17151344.3 filed on Jan. 13, 2017.

\* cited by examiner

METHOD OF CONTROLLING USER INPUT USING PRESSURE SENSOR UNIT FOR FLEXIBLE DISPLAY DEVICE

CLAIM OF PRIORITY

This application makes reference to, incorporates the same herein, and claims all benefits accruing under 35 U.S.C. §119 from an application earlier filed in the Korean Intellectual Property Office on 18 Dec. 2012 and there duly assigned Serial No. 10-2012-0148229.

BACKGROUND OF THE INVENTION

Field of the Invention

An embodiment of the present invention relates to a method of controlling a display device, and more particularly, to a method of controlling a user input using a pressure sensor unit for a flexible display device.

Description of the Related Art

Touch screen panels are used as input units of a smart phone and a smart pad that are currently widely used.

A touch screen panel is an input device which allows a user to input a command by selecting the indication content displayed on a screen of an image display device by using his or her fingers or other objects. Touch here generally refers to physical contact between human fingers or other objects and the touch screen panel.

The touch screen panel is generally provided on the front face of the image display device in order to convert a contact position of the human hand or the object into an electrical signal. Therefore, the indication content selected in the contact position is received as an electrical input signal.

Since the touch screen panel may replace an additional input device coupled to the image display device such as a keyboard and a mouse, application of such touch screen panel is gradually increasing.

Methods of realizing a touch screen panel include a resistance layer method, a photo-sensing method, and an electro-capacitive method. Among these methods, the widely used electro-capacitive touch screen panel senses a change in capacitance formed by a conductive sensing electrode with another peripheral sensing electrode or a ground electrode when a finger contacts the touch screen panel to convert the contact position into the electrical signal.

Since the contemporary electro-capacitive touch screen panel senses the change in capacitance by dermal contact of the finger, when a touch is made by a gloved hand or by a sharp nonconductive pen, the touch is not sensed.

In addition, in order to zoom in/out a displayed image using the contemporary electro-capacitive touch screen panel, two fingers are to be made to contact the touch screen panel and to perform dragging.

That is, in order to zoom in/out the image, a user must hold the panel by one hand and contact the panel by two fingers of the other hand. Therefore, the user must use both hands, which is inconvenient.

In addition, a flexible image display device is recently being developed. In this case, the touch screen panel attached onto the flexible image display device is required to have a flexible characteristic.

In the contemporary touch screen panel, sensing electrodes are commonly formed on a glass substrate. Since the glass substrate must have a thickness of no less than a uniform value to be returned in a process, however, it is impossible to satisfy the characteristic that requires a small thickness and to realize the flexible characteristic.

The above information disclosed in this Background section is only for enhancement of understanding of the background of the described technology and therefore it may contain information that does not form the prior art that is already known in this country to a person of ordinary skill in the art.

SUMMARY OF THE INVENTION

Accordingly, an aspect of the present invention provides a method of controlling a user input using a pressure sensor unit for a flexible display device in which the pressure sensor unit for sensing a touch position through pressure transmitted when a touch is made is formed on one surface of a substrate. With this method, a user may zoom in/out a displayed image by only one hand using the intensity and pattern of input touch pressure.

In order to achieve the foregoing and/or other aspects of the present invention, there is provided a method of controlling a user input using a pressure sensor unit including a plurality of first electrodes arranged on one surface of a first substrate in a first direction and a plurality of second electrodes positioned on the first electrodes and arranged in a second direction for a flexible display device. The method includes steps of: after a specific region of a top surface of the first substrate is touched, determining whether intensity of a sensing signal generated by a changed in a distance between the first electrodes and the second electrodes corresponding to the touch region is no less than a threshold value; when it is determined that the intensity of the sensing signal is no less than the threshold value, calculating a touch position at a point of time and setting the calculated touch position as a center position of increase/reduction in an image; determining whether touch pressure in the touch position is increased or reduced after the point of time; and, when the touch pressure is increased or reduced, zooming in or out an image by increase or reduction in the intensity of the sensing signal corresponding to the touch pressure.

When it is determined that the intensity of the sensing signal is smaller than the threshold value, a step of calculating only the touch position using the touch sensing signal is further included.

A plurality of pixels are formed on a display region of the first substrate and the pressure sensor unit is positioned under the plurality of pixels.

The pressure sensor unit includes the plurality of first electrodes patterned on one surface of the first substrate and arranged in the first direction, an insulating layer formed on an entire surface of the first substrate including the first electrodes, the plurality of second electrodes formed on the insulating layer and arranged in the second direction that intersects the first electrodes, and a buffer layer formed on the second electrodes to planarize a surface.

Spacers that maintain a distance between the first electrodes and the second electrodes are provided in the insulating layer.

The plurality of pixels are formed on the buffer layer.

The first substrate may be formed of a transparent material having a flexible characteristic, which may be polyimide.

In accordance with the embodiments of the present invention, in the flexible display device in which the input sensor unit for sensing the touch position through the pressure transmitted when the touch is made is formed on one surface of the substrate, the user may zoom in/out the displayed image by only one hand using the intensity and pattern of the input touch pressure.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

Figure 1:
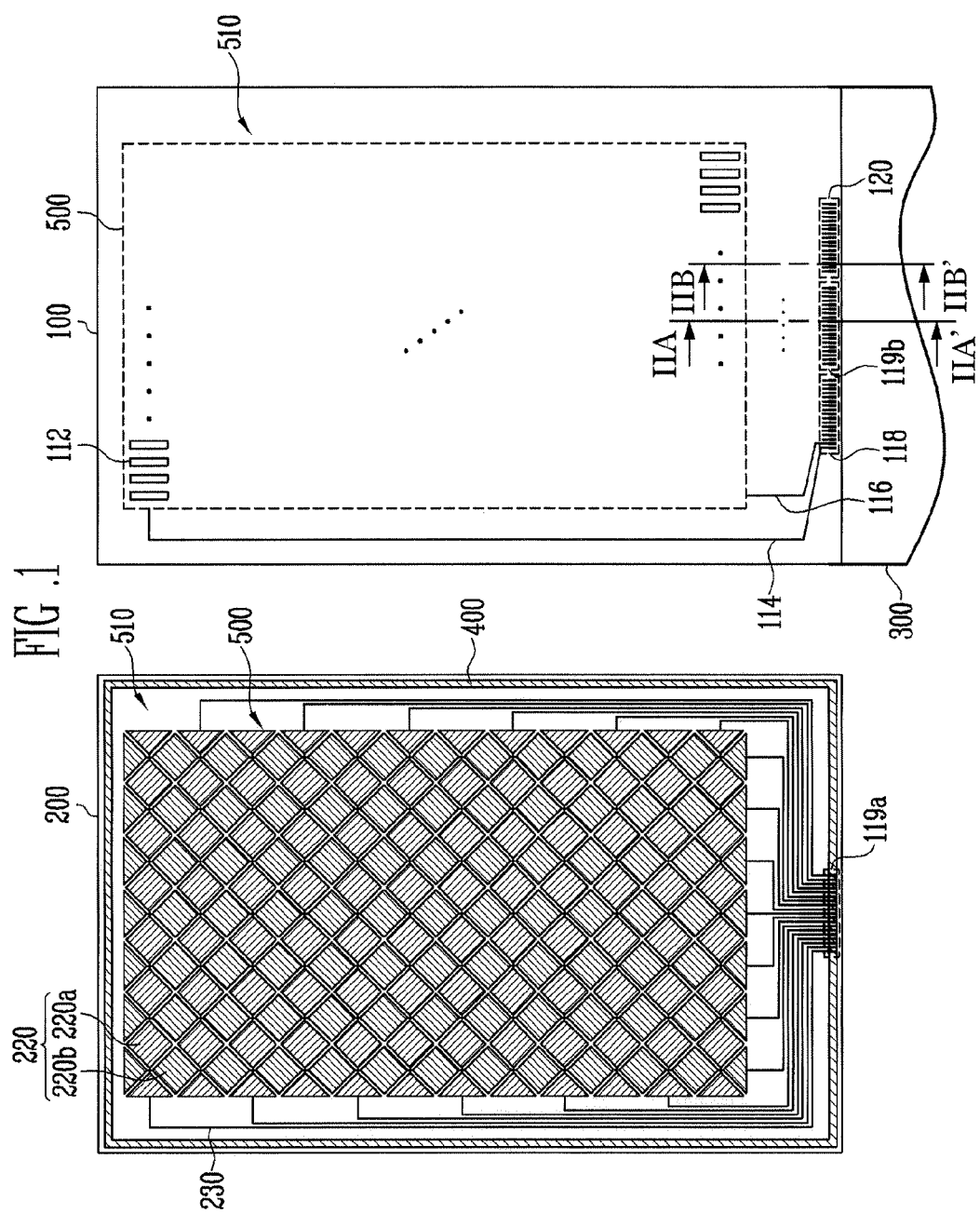
FIG. 1 is an exploded plan view of a flexible display device constructed with the principle of an embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. In addition, when an element is referred to as being "on" another element, it can be directly on the other element or be indirectly on the other element with one or more intervening elements interposed therebetween. Also, when an element is referred to as being "connected to" another element, it can be directly connected to the other element or be indirectly connected to the other element with one or more intervening elements interposed therebetween. Hereinafter, like reference numerals refer to like elements.

Hereinafter, the embodiment of the present invention will be described in detail with reference to the accompanying drawings.

According to the embodiment of the present invention, a pressure sensor unit is formed on one surface of a bottom substrate of a display device so that a touch may be sensed even when a touch is made by a gloved hand or by a sharp nonconductive pen as well as by dermal contact of a finger while minimizing the entire thickness of the display device.

In addition, an electro-capacitive touch screen panel is formed on one surface of a top substrate of the display device so that the touch may be minutely sensed.

In addition, a user may increase/reduce a displayed image by only one hand using the intensity and pattern of pressure input through the pressure sensor unit.

At this time, the display device may be a liquid crystal display (LCD) and an organic light emitting display. In particular, since the organic light emitting display may be realized to have a flexible characteristic, the organic light emitting display may be preferably used as the display device according to the embodiment of the present invention.

Therefore, according to the embodiment of the present invention, a flexible organic light emitting display is taken as an example.

Figure 2A:
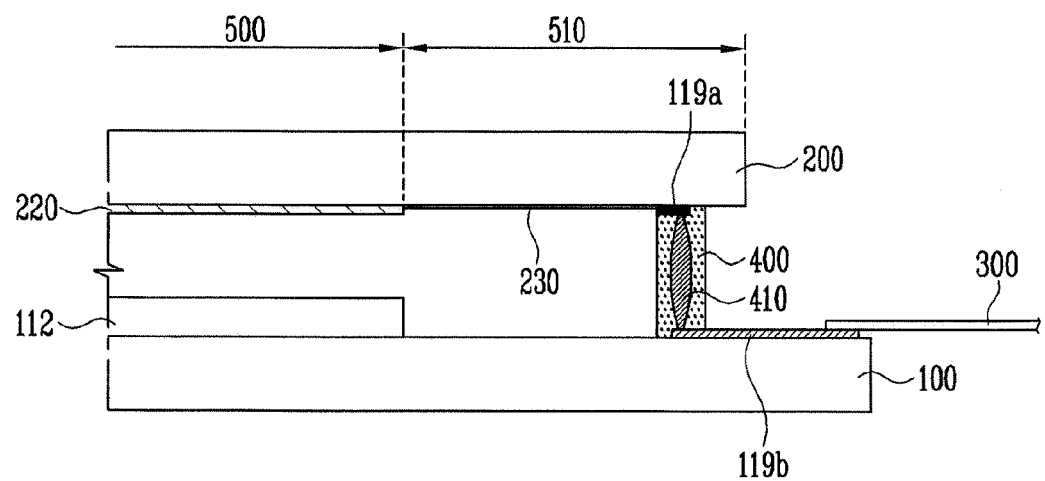
FIG. 2A is a cross-sectional view illustrating a connection type of the pad units illustrated in FIG. 1 along line IIA-IIA' when the flexible display device is assembled.
Figure 2B:
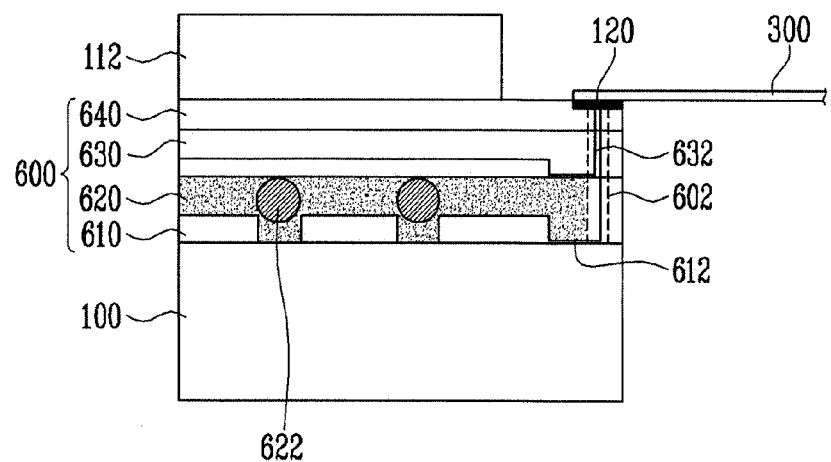
FIG. 2B is a cross-sectional view illustrating a connection type of the pad units illustrated in FIG. 1 along line IIB-IIB'.

FIG. 1 is an exploded plan view of a flexible display device constructed with the principle of an embodiment of the present invention. FIGS. 2A and 2B are sectional views illustrating a connection type of the pad units illustrated in FIG. 1.

In the embodiment of the present invention of FIG. 1, a flexible organic light emitting display in which a touch screen panel and a pressure sensor unit are integrated with each other is illustrated. However, the embodiment of the present invention is not limited to the above.

That is, the flexible display device according to the embodiment of the present invention may be realized so that only the pressure sensor unit is provided on one surface of the bottom substrate of the display device.

In the embodiment of FIG. 1, sensing patterns and sensing lines that realize the touch screen panel are directly formed on one surface of the top substrate 200 of the organic light emitting display device and first electrodes and second electrodes that realize the pressure sensor unit are directly formed on one surface of the bottom substrate 100 of the organic light emitting display.

At this time, the top substrate 200 that functions as an encapsulating substrate of the organic light emitting display device may be formed of a flexible material.

In addition, one surface of the top substrate 200 may correspond to the internal surface of the top substrate. Therefore, the top substrate illustrated in FIG. 1 corresponds to the internal surface of the top substrate.

The above is only an embodiment of the present invention and the embodiment of the present invention is not limited to the above. That is, the sensing patterns 220 of the touch screen panel may be formed on the external surface of the top substrate 200 and may be formed on the internal and external surfaces of the top substrate.

In addition, in the embodiment of the present invention, the pressure sensor unit is mounted on the bottom substrate 100. The pressure sensor unit senses a touch position through pressure transmitted when a touch is made even when an object other than a finger contacts the touch screen panel.

For this purpose, the pressure sensor unit includes first electrodes and second electrodes that are arranged in different layers to intersect each other and spacers that maintain the distance between the first electrodes and the second electrodes.

In addition, the pressure sensor unit according to the embodiment of the present invention lets a user zoom in/out a displayed image by only one hand using the intensity and pattern of pressure input through the pressure sensor as well as senses the touch position, which will be described in detail with reference to FIGS. 5 and 6.

The structure of the embodiment of the present invention will be described in detail with reference to FIG. 1.

In the display device according to the embodiment of the present invention, with respect to a plurality of pixels 112 formed in a display region 500 of the bottom substrate 100, a pressure sensor unit in which the sensing patterns 220 of the touch screen panel and sensing lines 230 for connecting the sensing patterns 220 to an external touch integrated circuit (IC) (not shown) through a first touch pad unit 119a are formed on one surface of the top substrate 200 that seals up the bottom substrate 100, the pressure sensor unit including first electrodes and second electrodes that are arranged in different layers to intersect each other, and spacers that maintain the distance between the first electrodes and the second electrodes is formed on one surface of the bottom substrate 100 on which the plurality of pixels 112 are formed.

That is, the pressure sensor unit is directly formed on one surface of the bottom substrate 100 and the plurality of pixels 112 are formed in a region that overlaps the pressure sensor unit.

The sensing patterns 220 are formed in the display region 500 of the top substrate 200, the sensing lines 230 are formed in a non-display region 510 positioned outside the display region 500, and a sealing material 400 for adhering the top substrate 200 and the bottom substrate 100 to each other is coated at the edge of the non-display region 510.

In addition, a plurality of signal lines 114 and 116 are connected to the pixels 112 formed in the display region 500 of the bottom substrate 100 and the signal lines 114 and 116 are arranged in the non-display region 510.

In FIG. 1, the scan lines 114 and the data lines 116 as the signal lines are arranged. However, emission control lines for controlling emission of organic light emitting diodes (OLED) provided in the pixels may be further provided.

At this time, each of the pixels includes an OLED that is a self-emissive element, a plurality of transistors, and at least one capacitor.

As illustrated in FIG. 1, the signal lines 114 and 116 are connected to a driving pad unit 118 provided at one end of the non-display region 510 of the bottom substrate 100 to receive a signal from an external driving IC (not shown) mounted on a flexible printed circuit board (FPCB) 300.

In addition, a second touch pad unit 119b and a pressure sensor pad unit 120 are adjacently provided on the side surfaces of the driving pad unit 118, respectively. The pressure sensor unit is electrically connected to the pressure sensor pad unit 120 and the first touch pad unit 119a formed on the top substrate 200 is electrically connected to the second touch pad unit 119b.

At this time, a connection type of the first touch pad unit 119a formed on the top substrate 200 and the second touch pad unit 119b formed on the bottom substrate 100 may be realized by the embodiment illustrated in FIG. 2A.

That is, in reference to FIG. 2A, the first touch pad unit 119a of the top substrate 200 is formed to overlap the sealing material 400 and a plurality of pads that form the first touch pad unit 119a are electrically connected to the pads of the second touch pad unit 119b provided at one end of the non-display region of the bottom substrate through a plurality of conductive media (for example, conductive balls 410) provided in the sealing material 400.

In FIG. 2A, the pixels 112 are illustrated to be formed on the bottom substrate 100 for convenience sake. However, a pressure sensor unit 600 is formed between the pixels 112 and the bottom substrate 100, which will be described with reference to FIG. 2B.

Next, as illustrated in FIG. 2B, in the pressure sensor unit 600 directly formed on one surface of the bottom substrate 100, a plurality of first lines 612 connected to first electrodes 610 and a plurality of second lines 632 connected to second electrodes 630 arranged in a direction that intersects the first electrodes 610 are electrically connected to the pads of the pressure sensor pad unit 120 provided at one end of the non-display region of the bottom substrate 100 through contact holes 602, respectively.

At this time, the bottom substrate 100 may be formed of a flexible polyimide material.

The pressure sensor unit 600 has a structure in which the plurality of first electrodes 610 directly patterned on one surface of the bottom substrate 100 and arranged in a first direction, an insulating layer 620 formed on the entire surface of the bottom substrate including the first electrodes 610, the second electrodes 630 formed on the insulating layer 620 and arranged in the direction that intersects the first electrodes 610, and a buffer layer 640 formed on the second electrodes to planarize the surface are sequentially laminated. The plurality of pixels 112 are formed on the buffer layer 640.

In addition, spacers 622 that maintain the distance between the first electrodes 610 and the second electrodes 630 are included in the insulating layer 620 and the insulating layer may be formed of a pressure conductivity variable material. The structure and operation of the pressure sensor unit will be described in detail with reference to FIGS. 3 and 4.

In the above structure, the pad units provided at one end of the non-display region 510 of the bottom substrate 100, that is, the driving pad unit 118, the second touch pad unit 119b, and the pressure sensor pad unit 120 are electrically connected to the same FPCB 300.

In addition, a driving IC (not shown) for driving a plurality of pixels provided in the pixel region of the bottom substrate 100, a touch IC (not shown) for controlling the operation of the sensing patterns 220 provided on the top substrate 200, and a pressure sensor IC for controlling the operation of the pressure sensor unit 600 formed on one surface of the bottom substrate are mounted on the FPCB 300. At this time, the driving IC, the touch IC, and the pressure sensor IC may be realized by separate ICs or may be realized by one integral IC that realizes the functions of the driving IC, the touch IC, and the pressure sensor IC.

That is, in the embodiment of the present invention, the FPCB 300 is integrated into one so that the bonding and testing processes of the FPCB are simplified and that it is possible to facilitate manufacturing and to minimize the price of a product.

In the embodiment of the present invention, as described above, the pressure sensor unit is directly formed on one surface of the bottom substrate of the display device.

Figure 3:
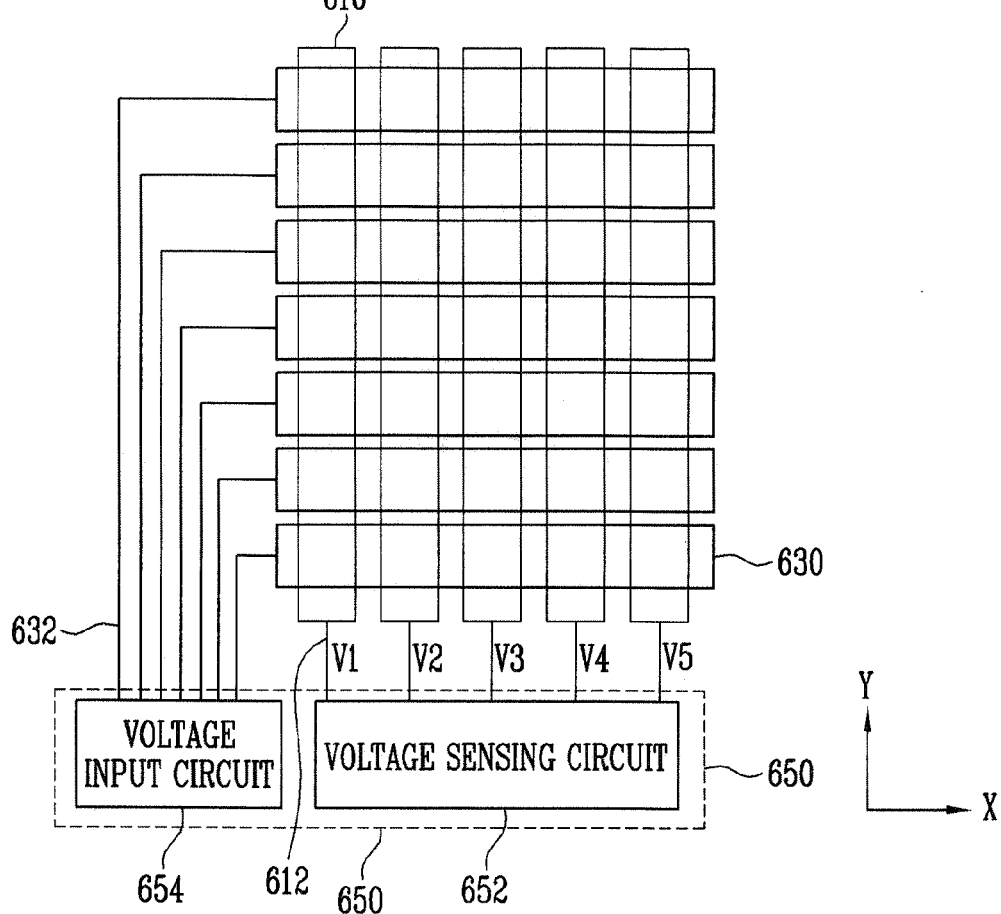
FIG. 3 is a plan view schematically illustrating the structure of a pressure sensor unit constructed with the principle of an embodiment of the present invention.
Figure 4:
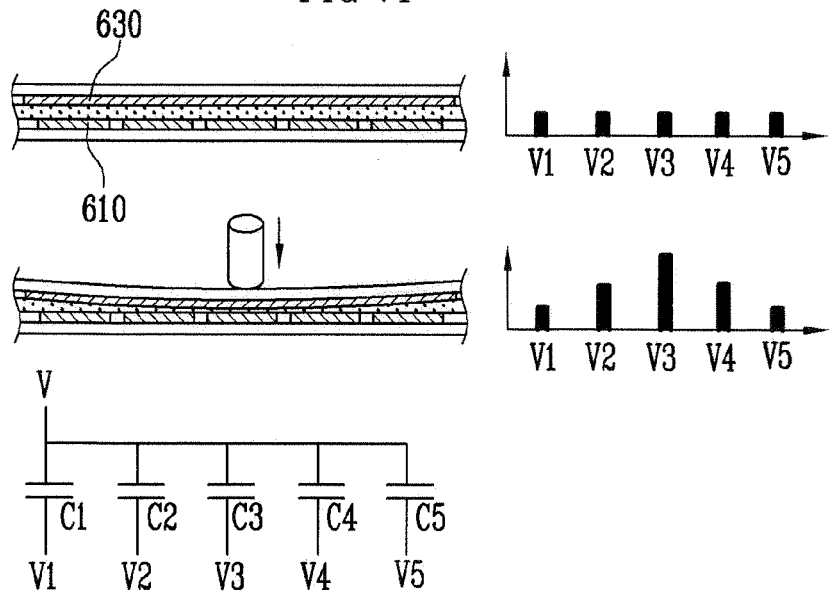
FIG. 4 is a view schematically illustrating the operation of the pressure sensor unit constructed with the principle of the embodiment of the present invention.

FIG. 3 is a plan view schematically illustrating the structure of a pressure sensor unit according to an embodiment of the present invention. FIG. 4 is a view schematically illustrating the operation of the pressure sensor unit according to the embodiment of the present invention.

First, in reference to the embodiment illustrated in FIG. 3, the first electrodes 610 of the pressure sensor unit are arranged in a first direction (for example, an Y axis direction) and are electrically connected to a voltage sensing circuit 652 through the first lines 612 connected to the ends of the first electrodes 610.

In addition, the second electrodes 630 are arranged in a second direction (for example, an X axis direction) that intersects the first electrodes 610 and are electrically connected to a voltage input circuit 654 through the second lines 632 connected to the ends of the second electrodes 630.

At this time, the first electrodes 610 and the first lines 612 are directly patterned on the bottom substrate (100 of FIG. 2B) having a flexible characteristic and the second electrodes 630 and the second lines 632 are formed on the insulating layer formed on the entire surface of the bottom substrate including the first electrodes 610. The spacers 622 formed of an elastic material are provided in the insulating layer.

In addition, the voltage sensing circuit 652 and the voltage input circuit 654 are integrated in one pressure sensor IC 650. As described above with reference to FIG. 2B, the pressure sensor IC 650 is mounted on the FPCB 300 adhered to the pressure sensor pad unit 120. That is, the first and second electrodes 610 and 630 are electrically connected to the pressure sensor IC 650 via the first and second lines 612 and 632 and the pressure sensor pad unit 120.

In the pressure sensor unit of the above structure, as illustrated in FIG. 4, in the second electrodes 630 to which a predetermined voltage V is applied and the first electrodes 610 positioned in the region that intersects the second electrodes 630, when a predetermined region is touched, the distance between the top electrodes and the bottom electrodes is changed by touch pressure so that capacitances C1 through C5 in the touch region change and that a difference among voltages V1 through V5 output to the second electrodes 630 is generated. The difference is finally sensed so that a touch position may be sensed.

In addition, the pressure sensor unit according to the embodiment of the present invention lets a user zoom in/out a displayed image by only one hand using the intensity and pattern of the touch pressure through a control circuit provided in the pressure sensor IC 650 as well as senses the touch position.

Hereinafter, a method of controlling a user input using the pressure sensor unit according to the embodiment of the present invention will be described in detail with reference to FIGS. 5 and 6.

Figure 5:
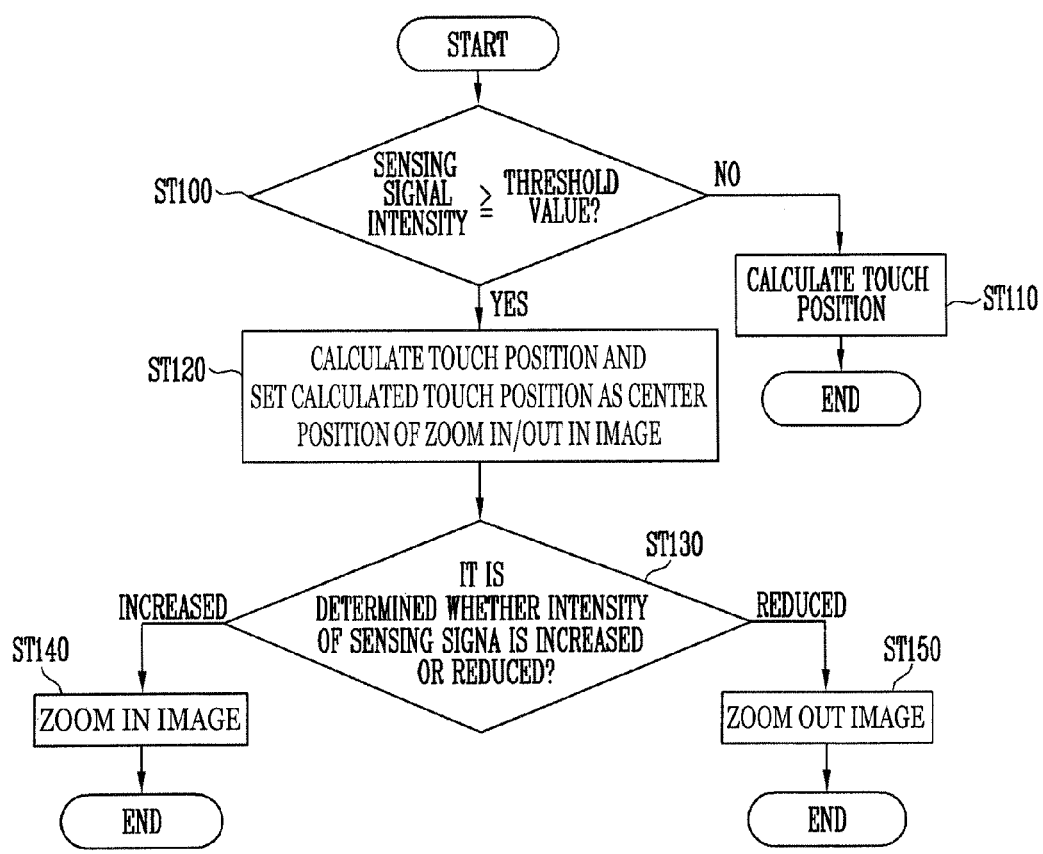
FIG. 5 is a flowchart illustrating a method of controlling a user input using the pressure sensor unit constructed with the principle of the embodiment of the present invention.

FIG. 5 is a flowchart illustrating a method of controlling a user input using the pressure sensor unit according to the embodiment of the present invention. FIG. 6 is a graph illustrating a change by time of sensing signal intensity of the pressure sensor unit by the controlling method illustrated in FIG. 5.

As described above with reference to FIGS. 3 and 4, when a user touches a predetermined region, the distance between the two electrodes of the pressure sensor unit, that is, the second electrode 630 and the first electrode 610 positioned in the region that intersects the second electrode 630 is changed by the touch pressure so that the capacitance in the touch region changes and that a difference in the voltages output to the second electrodes 630 is generated. The difference is finally sensed so that a touch position may be sensed.

That is, in sensing the touch position, a voltage difference between the first electrodes and the second electrodes in a corresponding region is output as a sensing signal and the controlling circuit provided in the pressure sensor IC 650 calculates the touch position using the sensing signal.

In the embodiment of the present invention, not only the touch position is sensed but also the image is zoomed in/out using the intensity and pattern of the touch pressure. Therefore, when the user senses the touch position, it is determined whether the intensity of the sensing signal is no less than a predetermined threshold value Vth (ST 100).

In this case, when the touch pressure of the user is small so that the touch sensing signal for the touch pressure is smaller than the threshold value, only the touch position is calculated using the touch sensing signal (ST 110).

When the touch pressure of the user is large so that the touch sensing signal for the touch pressure is no less than the threshold value, not only the touch position is calculated but also the image of the corresponding touch region is zoomed in/out.

Figure 6:
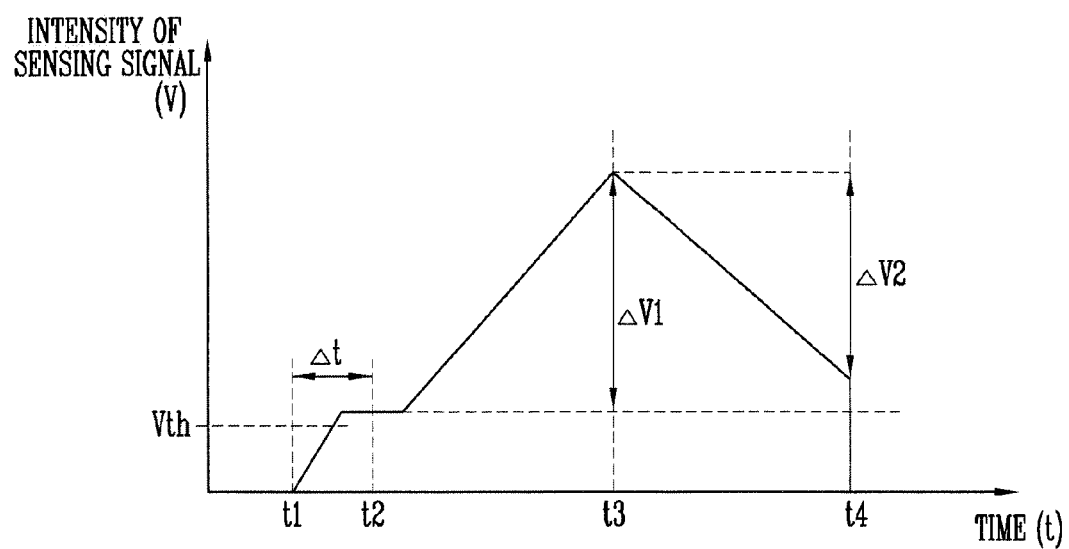
FIG. 6 is a graph illustrating a change by time of sensing signal intensity of the pressure sensor unit by the controlling method illustrated in FIG. 5.

More concretely, as illustrated in FIG. 6, when it is determined that the intensity of the sensing signal by the touch pressure of the user is no less than the threshold value at a second point of time t2 after the lapse of uniform time Δt from a first point of time t1 at which the touch of the user is initially performed, the touch position at the second point of time t2 is calculated and the calculated touch position is set as the center position of the zoom in/out in the image (ST 120).

Next, it is determined whether the touch pressure of the user is increased or reduced in the touch position by calculating whether the intensity of the sensing signal corresponding to the touch pressure is increased or reduced (ST 130).

That is, when the touch pressure is increased after the second point of time t2 at which the intensity of the sensing signal is determined to be no less than the threshold value, the image is increased by the increase in the intensity of the sensing signal corresponding to the touch pressure (ST 140).

When the touch pressure is reduced after the second point of time t2 at which the intensity of the sensing signal is determined to be no less than the threshold value, the image is reduced by the increase in the intensity of the sensing signal corresponding to the touch pressure (ST 150).

In reference to the embodiment of FIG. 6, when the touch pressure in the position is continuously increased to a third point of time t3 after the touch position at the second point of time t2 where the intensity of the sensing signal is no less than the threshold value is set as the center position of the zoom in/out in the image, the image is zoomed in by the increase ΔV1 in the intensity of the sensing signal corresponding to the touch pressure.

When the touch pressure in the position is continuously reduced from the third point of time t3 to a fourth point of time t4, the image is zoomed out by the reduction ΔV2 in the intensity of the sensing signal corresponding to the touch pressure.

The graph illustrated in FIG. 6 describes an embodiment in which the image is first increased based on the touch position set at the first point of time t1 and the image is reduced. However, the embodiment of the present invention is not limited to the above.

That is, when it is assumed that the touch pressure is significantly high when the touch is initially input, on the contrary to the embodiment of FIG. 6, the image may be first reduced and may be increased and the image may be only increased or reduced.

In addition, when the image is not sufficiently zoomed in/out by performing the touch once, the touch position may be touched again to repeatedly perform the above steps so that the user may sufficiently increase/reduce the image as he or she wishes.

In addition, when the user wishes to continuously increase/reduce the image based on another position while increasing/reducing the image, not the initial touch position but another position that the user wishes is touched at pressure of no less than the threshold value.

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A method of controlling a user input using a pressure sensor unit which includes a plurality of first electrodes arranged on one surface of a first substrate in a first direction and a plurality of second electrodes positioned on the first electrodes and arranged in a second direction for a flexible display device, the method comprising steps of:
   at a second point of time after a lapse of uniform time from a first point of time at which a specific region of a top surface of the first substrate is touched, determining whether intensity of a sensing signal generated by a change in a distance between the first electrodes and the second electrodes corresponding to the specific region is no less than a threshold value;
   when it is determined that the intensity of the sensing signal is no less than the threshold value, calculating a touch position at the second point of time and setting the touch position as a center position of increase/reduction in an image;
   determining whether the intensity of the sensing signal corresponding to the touch position is increased or reduced after the second point of time;
   when the intensity of the sensing signal is increased, zooming in the image corresponding to increase in the intensity of the sensing signal; and
   when the intensity of the sensing signal is reduced, zooming out the image corresponding to reduction in the intensity of the sensing signal.

2. The method as claimed in claim 1, wherein, when it is determined that the intensity of the sensing signal is smaller than the threshold value, further comprising a step of calculating only the touch position using the sensing signal.

3. The method as claimed in claim 1,
   wherein a plurality of pixels are formed on a display region of the first substrate, and
   wherein the pressure sensor unit is positioned under the plurality of pixels.

4. The method as claimed in claim 3, wherein the pressure sensor unit comprises:
   the plurality of first electrodes patterned on the one surface of the first substrate and arranged in the first direction;
   an insulating layer formed on an entire surface of the first substrate including the first electrodes;
   the plurality of second electrodes formed on the insulating layer and arranged in the second direction that intersects the first electrodes; and
   a buffer layer formed on the second electrodes to planarize a surface.

5. The method as claimed in claim 4, wherein spacers that maintain a distance between the first electrodes and the second electrodes are provided in the insulating layer.

6. The method as claimed in claim 4, wherein the plurality of pixels are formed on the buffer layer.

7. The method as claimed in claim 1, wherein the first substrate is formed of a transparent material having a flexible characteristic.

8. The method as claimed in claim 7, wherein the flexible material is polyimide.

9. A method of controlling a user input using a pressure sensor unit which includes a plurality of first electrodes arranged on one surface of a first substrate in a first direction and a plurality of second electrodes positioned on the first electrodes and arranged in a second direction for a flexible display device, the method comprising steps of:
   at a second point of time after a lapse of uniform time from a first point of time at which first specific region of a top surface of the first substrate is touched, determining whether intensity of a first sensing signal generated by a change in a distance between the first electrodes and the second electrodes corresponding to the first specific region is no less than a threshold value;
   when it is determined that the intensity of the first sensing signal is no less than the threshold value, calculating a first touch position at the second point of time and setting the first touch position as a center position of increase/reduction in an image;
   determining whether the intensity of the first sensing signal corresponding to the first touch position is increased or reduced after the second point of time;
   zooming in the image corresponding to increase in the intensity of the first sensing signal during a first period in which the intensity of the first sensing signal is increased; and
   zooming out the image corresponding to reduction in the intensity of the first sensing signal during a second period in which the intensity of the first sensing signal is reduced.

10. The method as claimed in claim 9, wherein the first period precedes the second period.

11. The method as claimed in claim 9, wherein the second period precedes the first period.

12. The method as claimed in claim 9, further comprising:
    when a second specific region different from the first specific region is touched while the image is zoomed in or out on the basis of the first touch position, determining whether intensity of a second sensing signal generated by a change in a distance between the first electrodes and the second electrodes corresponding to the second specific region is no less than a threshold value; and
    when it is determined that the intensity of the second sensing signal is no less than the threshold value, calculating a second touch position at a point of time and setting the second touch position as the center position of the increase/reduction in the image.

13. A method of controlling a user input using a pressure sensor unit which includes a plurality of first electrodes arranged on one surface of a first substrate in a first direction and a plurality of second electrodes positioned on the first electrodes and arranged in a second direction for a flexible display device, the method comprising steps of:
    at a second point of time after a lapse of uniform time from a first point of time at which a touch of user is initially performed on a top surface of the first substrate, determining whether intensity of a sensing signal generated by a change in a distance between the first electrodes and the second electrodes is no less than a threshold value, wherein the change in the distance corresponds to a touch pressure of the user;
    when it is determined that the intensity of the sensing signal is no less than the threshold value, calculating a touch position at the second point of time and setting the touch position as a center position of increase/reduction in an image;
    determining whether the intensity of the sensing signal corresponding to the touch position is increased or reduced after the second point of time;

when the intensity of the sensing signal is increased, zooming in the image corresponding to increase in the intensity of the sensing signal; and when the intensity of the sensing signal is reduced, zooming out the image corresponding to reduction in the intensity of the sensing signal.

14. The method as claimed in claim 13, wherein, when it is determined that the intensity of the sensing signal is smaller than the threshold value, further comprising a step of calculating only the touch position using the sensing signal.

15. The method as claimed in claim 13,
wherein a plurality of pixels are formed on a display region of the first substrate, and
wherein the pressure sensor unit is positioned under the plurality of pixels.

16. The method as claimed in claim 15, wherein the pressure sensor unit comprises:
the plurality of first electrodes patterned on the one surface of the first substrate and arranged in the first direction;
an insulating layer formed on an entire surface of the first substrate including the first electrodes;
the plurality of second electrodes formed on the insulating layer and arranged in the second direction that intersects the first electrodes; and
a buffer layer formed on the second electrodes to planarize a surface.

17. The method as claimed in claim 16, wherein spacers that maintain a distance between the first electrodes and the second electrodes are provided in the insulating layer.

18. The method as claimed in claim 16, wherein the plurality of pixels are formed on the buffer layer.

19. The method as claimed in claim 13, wherein the first substrate is formed of a transparent material having a flexible characteristic.

20. The method as claimed in claim 19, wherein the flexible material is polyimide.

* * * * *